United States Patent
Kim et al.

(10) Patent No.: US 10,003,376 B2
(45) Date of Patent: Jun. 19, 2018

(54) RF MODULE

(71) Applicant: LG INNOTEK CO., LTD., Seoul (KR)

(72) Inventors: Yu Seon Kim, Seoul (KR); Jung Kwon Park, Seoul (KR); Kyong Ho Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days. days.

(21) Appl. No.: 15/534,184

(22) PCT Filed: Nov. 3, 2015

(86) PCT No.: PCT/KR2015/011672
§ 371 (c)(1),
(2) Date: Jun. 8, 2017

(87) PCT Pub. No.: WO2016/093495
PCT Pub. Date: Jun. 16, 2016

(65) Prior Publication Data
US 2017/0346524 A1    Nov. 30, 2017

(30) Foreign Application Priority Data

Dec. 10, 2014   (KR) ........................ 10-2014-0177836

(51) Int. Cl.
*H04B 1/48* (2006.01)
*H04B 1/04* (2006.01)
*H04B 1/18* (2006.01)

(52) U.S. Cl.
CPC ............. *H04B 1/48* (2013.01); *H04B 1/0458* (2013.01); *H04B 1/18* (2013.01); *H04B 2001/485* (2013.01)

(58) Field of Classification Search
CPC .... H04W 52/0225; H04W 52/18; H04B 1/06; H04B 7/00; H04B 1/18; H04B 1/40; H04B 1/1027; H04B 1/109; H03F 1/0261; H03F 1/342; H03F 3/193; H03F 2200/294; H03G 1/0088; H03G 3/3068; H03H 9/0095
See application file for complete search history.

(56) References Cited

U.S. PATENT DOCUMENTS

2003/0128081 A1*   7/2003   Ella ...................... H03H 9/0095
                                                    333/133
2006/0035668 A1    2/2006   Li et al.
(Continued)

FOREIGN PATENT DOCUMENTS

KR    10-2003-0064085 A     7/2003
KR    10-2006-0135921 A    12/2006
(Continued)

*Primary Examiner* — Thanh Le
(74) *Attorney, Agent, or Firm* — LRK Patent Law Firm

(57) ABSTRACT

An RF module comprises: a first front end module (FEM) which allows a signal of a first bandwidth to pass and blocks a signal of a second bandwidth according to a first time constant which is determined by a plurality of devices provided in the inside thereof and a second FEM which blocks the signal of the first bandwidth and allows the signal of the second bandwidth to pass according to a second time constant which is determined by the plurality of devices provided in the inside thereof.

20 Claims, 10 Drawing Sheets

(56) References Cited

U.S. PATENT DOCUMENTS

2007/0085754 A1* 4/2007 Ella .................. H04B 1/18
              343/862
2014/0273887 A1* 9/2014 Black ................. H04B 1/40
              455/77

FOREIGN PATENT DOCUMENTS

KR    10-2008-0091537 A    10/2008
KR    10-2011-0130574 A    12/2011

* cited by examiner

RF MODULE

CROSS-REFERENCE TO RELATED APPLICATION(S)

The present application is a U.S. National Phase entry from International Application No. PCT/KR2015/011672, filed Nov. 3, 2015, which claims priority to Korean Patent Application No. 10-2014-0177836, filed Dec. 10, 2014, the disclosure of which is incorporated by reference herein in its entirety.

BACKGROUND OF THE INVENTION

1. Field of the Invention

The present invention relates to an RF (Radio Frequency) module.

2. Description of Related Art

In general, an RF module receiving an RF signal having a frequency of at least two bands is arranged at a rear end of an antenna with a diplexer to electrically separate a path of RF signal corresponding to a frequency of mutually different bands.

However, a problem may arise in that a matching circuit provided to each element can increase a path loss of RF module due to transmission lines connected therebetween, and as a result, a received power or sensitivity of transmission signal can be decreased.

Furthermore, another problem may arise in that process cost from parts integration can increase and the size of RF module can be increased, and there is no way of controlling an EMI (electron-Magnetic Interference) resultant from interference between parts.

Still furthermore, there may be posed a problem of reception characteristic at a load being disabled to be maintained due to decrease in efficiency of a diplexer caused by phase movement at a transmission line of matching circuit.

SUMMARY OF THE INVENTION

The technical subject to be solved by the present invention is to provide an RF module configured to reduce a branch loss and a path loss by removing a diplexer. Another object is to provide an RF module configured to reduce a manufacturing cost of a module by simplifying and miniaturizing an entire circuit.

In one general aspect of the present invention, there is provided an RF module, the RF module comprising: a first FEM (Front End Module) passing a signal of first band and interrupting a signal of second band in response to a first time constant determined by a plurality of elements disposed thereinside; and a second FEM interrupting a signal of first band and passing a signal of second band in response to a second time constant determined by a plurality of elements disposed thereinside.

Preferably, but not necessarily, the signal of first band may include a first signal and a second signal, each having a phase difference.

Preferably, but not necessarily, the first FEM may transmit a signal of first band received from an antenna to a first load, and transmit a signal of first band transmitted from the first load to the antenna, and the second FEM may transmit a signal of second band received from the antenna to a second load, and transmit a signal of second band transmitted from the second load to the antenna.

Preferably, but not necessarily, the first FEM may include first to fifth circuits, and the second FEM may include sixth and seventh circuits, wherein the first circuit, the fourth circuit and the fifth circuit may match the first load and impedance of the antenna at the signal of first band, and the sixth circuit and the seventh circuit may match the second load and impedance of the antenna at the signal of second band.

Preferably, but not necessarily, the first FEM may include first to fifth circuits, and the second FEM may include sixth and seventh circuits, wherein the fourth circuit may branch phases of first signal and second signal, and the fifth circuit and the seventh circuit may move a phase of signal at the second band.

Preferably, but not necessarily, the first FEM may include first to fifth circuits, and the second FEM may include sixth and seventh circuits, wherein the fourth circuit may interrupt a signal of second band and the sixth circuit may interrupt a signal of first band.

Preferably, but not necessarily, the first FEM may include first to fifth circuits, and the second FEM may include sixth and seventh circuits, wherein the first, third and fifth circuits may determine a spurious characteristic relative to the signal of first band, and the sixth circuit may determine a spurious characteristic relative to the signal of second band.

Preferably, but not necessarily, the first FEM may include first to fifth circuits, and the second FEM may include sixth and seventh circuits, wherein the second circuit may bypass a signal of first band, and the third circuit may convert a balance signal to an unbalance signal relative to the first and second signal, and convert an unbalance signal to a balance signal.

Preferably, but not necessarily, the first FEM may include first to fifth circuits, the second FEM may include sixth and seventh circuits, and the sixth and seventh circuits may determine a bandwidth of a signal at the second band.

Preferably, but not necessarily, the second FEM may further include eighth and ninth circuits, wherein the eighth circuit may determine a bandwidth of a signal at second band using a unit smaller than a basic unit determining bandwidth of a signal at the second band, and the ninth circuit may reduce a second harmonic of a signal at the second band.

Preferably, but not necessarily, the second FEM may further include a tenth circuit, wherein the tenth circuit may reduce a third harmonic of a signal at the second band.

Preferably, but not necessarily, any one circuit of the first to tenth circuits may include at least one of a resistor, a capacitor and an inductor.

Preferably, but not necessarily, the first time constant may be so determined as to be between 0.9 and 1.0 in size of reflection coefficient of at the first FEM relative to a frequency of a signal at the second band, and as to be positioned between −50° and 30° in phase of the reflection coefficient.

Preferably, but not necessarily, the second time constant may be so determined as to be between 0.9 and 1.0 in size of reflection coefficient at the second FEM relative to a frequency of a signal at the second band, and as to be positioned between −50° and 30° in phase of the reflection coefficient.

Advantageous Effects of the Invention

The advantageous effect of the present invention can be explained as under: That is, a diplexer is removed to advantageously decrease a branch loss and a path loss according to at least one of exemplary embodiments of the present invention. Furthermore, a diplexer is advantageously removed to simplify and miniaturize an entire circuit and to decrease a manufacturing cost of module according to at least one of exemplary embodiments of the present invention.

DETAILED DESCRIPTION OF THE INVENTION

Figure 1:
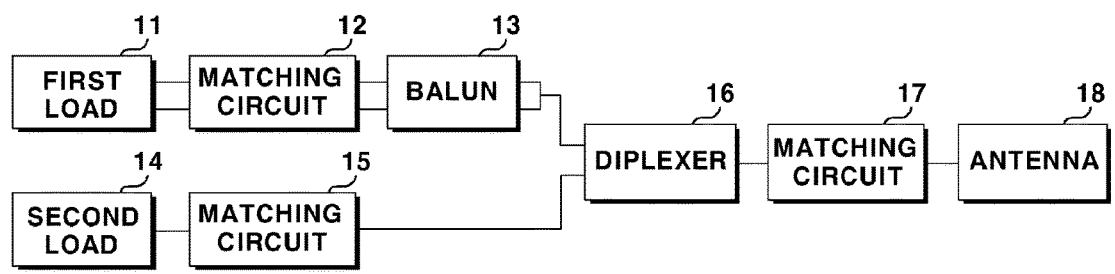
FIG. 1 is a schematic view illustrating a general RF module including a diplexer.

Reference will now be made in detail to embodiments, examples of which are illustrated in the accompanying drawings. Like reference numerals designate like elements throughout the specification, and any overlapping explanations that duplicate one another will be omitted.

In the following detailed description, the suffixes 'module', 'unit' and/or 'part' may be used for elements in order to facilitate the invention. Significant meanings or roles may not be given to the suffixes themselves and it is understood that the 'module', 'unit' and/or 'part' may be used together or interchangeably. In other instances, well-known methods, procedures, components, circuits, and networks have not been described in detail so as not to unnecessarily obscure aspects of the embodiments.

Furthermore, in the following detailed description, numerous specific details are set forth in order to provide a thorough understanding of the present disclosure. However, this disclosure may be embodied in many different forms and should not be construed as limited to any specific structure or function presented throughout this disclosure. Thus, the disclosure described herein is intended to embrace all such alternatives, modifications, variations and applications as may fall within the spirit and scope of the appended claims.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the terms "a" and "an" are open terms that may be used in conjunction with singular items or with plural items. That is, the singular forms "a," "an," and "the" may be intended to include the plural forms as well, unless the context clearly indicates otherwise.

Now, exemplary embodiments of the present invention will be described in detail with reference to the accompanying drawings. It should be apparent to the skilled in the art that the present invention may be materialized in other particular types within a scope not exceeding the spirit and essential features of the present invention.

FIG. 1 is a schematic view illustrating a general RF module including a diplexer. Referring to FIG. 1, a conventional RF module may include matching circuits (12, 15, 17), a BALUN (Balance-to-Unbalance, 12) and a diplexer (16). The RF module including the diplexer (16) may separate signals of mutually different bands received through an antenna (18) and transmit the same to a first load (11) and to the second load (14).

The matching circuits (12, 15, 17) may minimize the reflection loss of each part by being positioned at between each part. To be more specific, a matching circuit (16) disposed between the antenna (18) and the diplexer (16) can reduce the reflection loss between the antenna (18) and the diplexer (16), a matching circuit disposed between the BALUN (13) and the first load (11) can reduce the reflection loss between the BALUN (13) and the first load (11), and a matching circuit (15) disposed between the diplexer (16) and the second load (14) can reduce the reflection loss between the diplexer (16) and the second load (14).

The diplexer (16) may prevent signals outputted from the first and second loads (11, 14) from being mutually influenced, or transmit the signals to the antenna (18), or may be a branching filter element transmitting the signals to the first and second loads (11, 14) by dividing signals received from the antenna (18) in response to bands. The RF module having the configuration thus explained may include a loss generated by the diplexer (16). To be more specific, the loss generated by the diplexer (16) may include a power branch loss, an impedance matching loss and a path loss.

Figure 2:
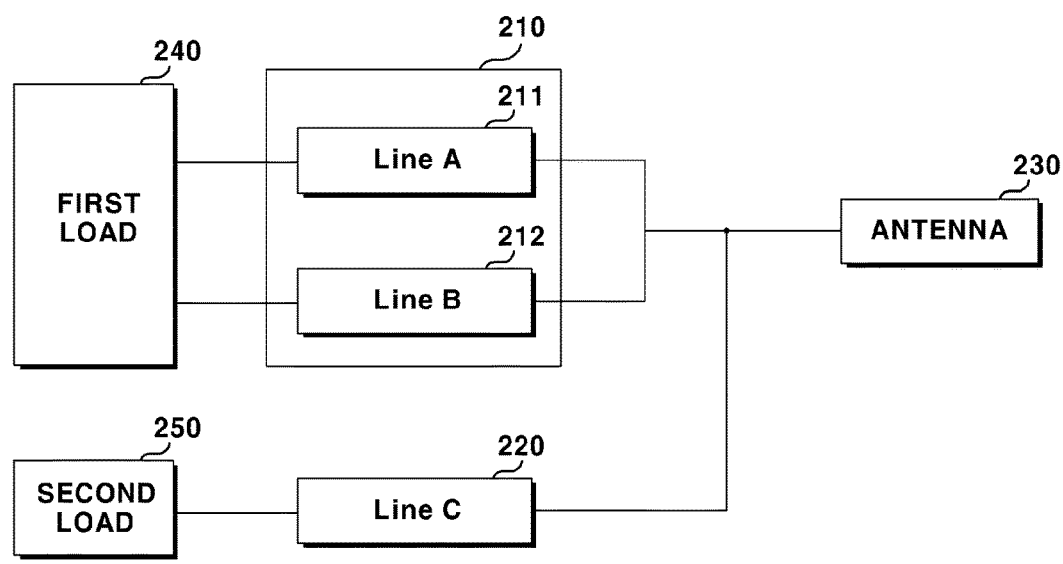
FIG. 2 is a schematic conceptual view illustrating an RF module according to an exemplary embodiment of the present invention.

FIG. 2 is a schematic conceptual view illustrating an RF module according to an exemplary embodiment of the present invention, where the RF module may include a first FEM (Front End Module, 210), and a second FEM (220).

The RF module according to the present invention may transmit signals of two frequency bands received through an antenna (230) to first and second loads (240, 250) respectively, or may transmit signals of two frequency bands outputted through the first and second loads (240, 250) to the antenna (230). To be more specific, the first FEM (210) may transmit a signal of first band received from the antenna (230) to the first load (240), and may transmit a signal of first band transmitted from the first load (240) to the antenna (230). Furthermore, the second FEM (220) may transmit a signal of second band received from the antenna (230) to the second load (250), and may transmit a signal of second band transmitted from the second load (250) to the antenna (230). In particular, the first and second FEMs (210, 220) included in the RF module according to the present invention may include a plurality of elements therein, and each of the first and second FEMs (210, 220) may interrupt or pass a signal of particular frequency by classifying the frequency band of signals in response to time constant determined by the plurality of elements disposed thereinside.

The first FEM (210) may include a Line A (211) and a Line B (212), and the second FEM (220) may include a Line C. Here, the Line A (211) and the Line B (212) may be transmission paths transmitted with the first and second signals included in a signal of frequency band transmitted from the antenna (230) to the first load (240) through the first FEM (210), or transmitted to the antenna (230) from the first load (240). Furthermore, the first and second signals may be signals each having a phase difference, albeit signals being of same frequency band.

The RF module provided through an exemplary embodiment of the present invention may provide signals of at least two or more frequency bands to a sender/receiver terminal that can simultaneously receive and send signals. Although the exemplary embodiment of the present invention has explained an example where signals of two frequency bands are received and sent, the present invention is not limited thereto. For example, although the RF module according to the present invention may be provided to a sender/receiver terminal receiving a signal of first band of 2.4 GHz and a signal of second band of 5 GHz, the present invention is not limited thereto.

The RF module according to the present invention, unlike the conventional RF module in FIG. 1, can transmit signals of two frequency bands by dividing the signals to the first load (240) and the second load (250), while not being disposed with a diplexer. As a result, the RF module according to the present invention can reduce a power branch loss, an impedance matching loss and a path loss generated by a diplexer.

Figure 3:
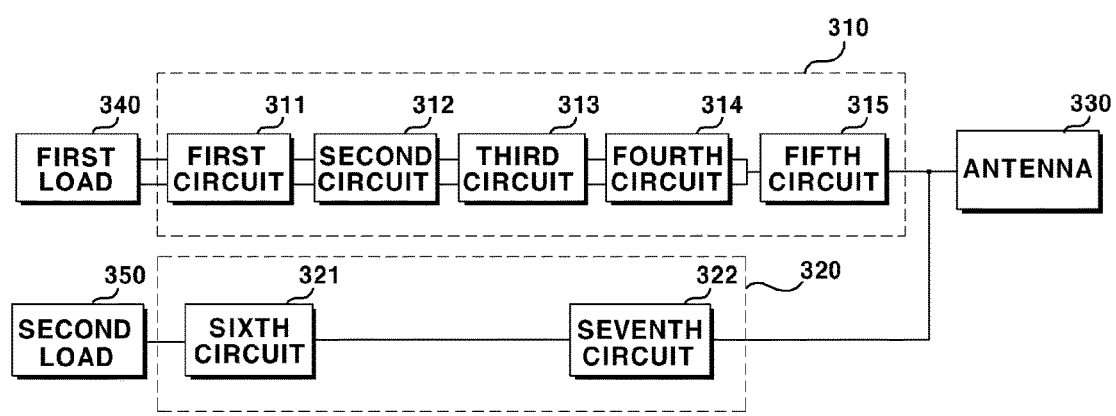
FIG. 3 is a schematic view illustrating an RF module according to an exemplary embodiment of the present invention.

FIG. 3 is a schematic view illustrating an RF module according to an exemplary embodiment of the present invention, where the RF module may include a first FEM (310) and a second FEM (320).

The first FEM (310) may include first to fifth circuits (311, 312, 313, 314, 315) and the second FEM (320) may include sixth circuit (321) and a seventh circuit (322). Here, the first to seventh circuits (311, 312, 313, 314, 315, 321, 322) may be a circuit including at least one of a resistor, a capacitor and an inductor.

As explained in the foregoing, the first and second FEMs (310, 320) included in the RF module according to the present invention may pass or interrupt a signal of particular frequency band through division or classification of frequency band of signal in response to a time constant determined by a plurality of elements disposed thereinside.

To be more specific, the first FEM (310) may pass a signal of first band in response to a first time constant, which is a time constant determined by first to fifth circuits disposed inside the first FEM (310), and may interrupt a signal of second band. Furthermore, the second FEM (320) may interrupt a signal of first band in response to a second time constant, which is a time constant determined by sixth and seventh circuits (321, 322) disposed inside the second FEM (320), and may pass a signal of second band.

Still furthermore, the first time constant determined by the first to fifth circuits (311~315) disposed inside the first FEM (310) may be so determined as to be between 0.9 and 1.0 in size of reflection coefficient at the first FEM (310) relative to a frequency of a signal at the second band, and as to be positioned between −50° and 30° in phase of reflection coefficient at the first FEM (310), and the second time constant determined by the sixth and seventh circuits (321, 322) disposed inside the second FEM (320) may be so determined as to be between 0.9 and 1.0 in size of reflection coefficient at the second FEM (320) relative to a frequency of a signal at the first band, and as to be positioned between −50° and 30° in phase of the reflection coefficient at the second FEM (320).

The first circuit (311), the fourth circuit (314) and the fifth circuit (315) included in the first FEM (310) may become a matching circuit that decreases a reflection coefficient by matching impedances of first load (340) and antenna (330) at a signal of first band.

The sixth circuit (321) and the seventh circuit (322) included in the second FEM (320) may become a matching circuit that decreases a reflection coefficient by matching impedances of second load (350) and antenna (330) at a signal of second band. When a first signal and a second signal having a phase difference is included in a signal of first band, the fourth circuit (314) included in the first FEM (310) may become a phase branching circuit that branches a phase of relevant first signal and a phase of relevant second signal.

The fifth circuit (315) included in the first FEM (310) and the seventh circuit (322) included in the second FEM (320) may become a phase moving circuit that moves a phase of a signal of second band. The fifth circuit (315) included in the first FEM (310) may become a cut-off circuit that passes a signal of first band and cuts-off a signal of second band. Furthermore, the sixth circuit (321) included in the second FEM (320) may be a cut-off circuit that passes a signal of second band, and cuts-off a signal of first band.

The first circuit (311), the third circuit (313) and the fifth circuit (315) included in the first FEM (310) may become a circuit that determines a spurious characteristic relative to a signal of first band, and the sixth circuit (321) included in the second FEM (320) may become a circuit that determines a spurious characteristic relative to a signal of second band.

The second circuit (312) included in the first FEM (310) may become a bypass circuit that bypasses a signal of first band, and the third circuit (313) included in the first FEM (310) may become a BALUN circuit that converts a balance signal to an unbalance signal relative to first and second signals included in a signal of first band, and converts an unbalance signal to a balance signal.

The sixth circuit (321) and the seventh circuit (322) included in the second FEM (320) may become a bandwidth determining circuit that determines a bandwidth of a signal at the second band. Furthermore, the second FEM (320) may further include an eighth circuit (not shown) in order to more finely adjust a bandwidth of a signal at the second band than the sixth and seventh circuits (321, 322) determine the bandwidth of a signal at the second band.

Furthermore, the second FEM (320) may further include a ninth circuit (not shown) that decreases generation of second harmonic of a signal at second band, and, if necessary, may further include a tenth circuit (not shown) that decreases a third harmonic of a signal at the second band.

FIGS. 4 to 7 are detailed views illustrating an RF module according to an exemplary embodiment of the present invention, where the circuits illustrated in FIGS. 4 to 7 show a detailed exemplary embodiments of RF module according to the present invention explained in FIG. 3, and the RF module according to the present invention is not limited in being realized by these exemplary embodiments.

Figure 4:
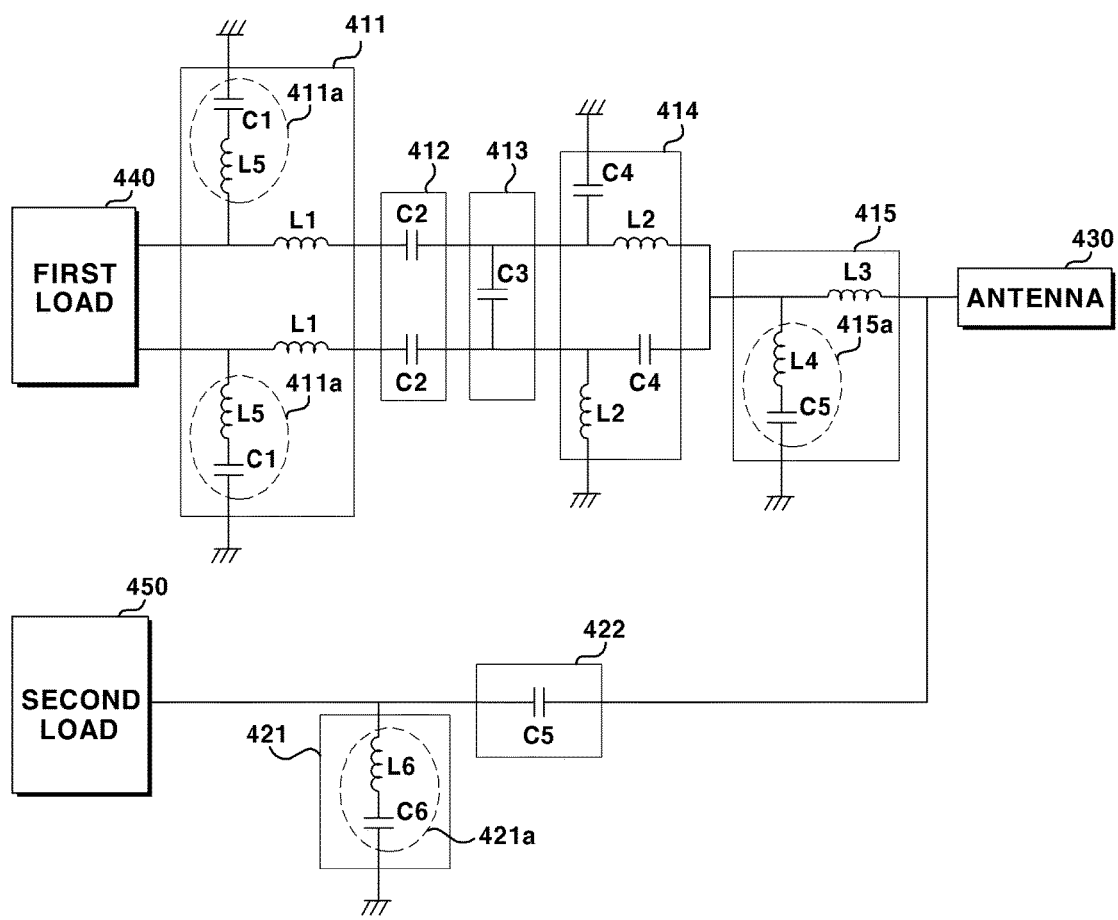
FIGS. 4 to 7 are detailed views illustrating an RF module according to an exemplary embodiment of the present invention.

Referring to FIG. 4, an RF module may include a first circuit (411) to a seventh circuit (422). Here, the first circuit (411) to the seventh circuit (422) may include at least one of capacitors (C1~C6) and inductors (L1~L6), and may include line resistors, albeit not being illustrated, as resistor values. Furthermore, each of the first circuit (411) to the seventh circuit (422) may correspond to each of the first circuit (311) to the seventh circuit (322) explained in FIG. 3.

To be more specific, the first circuit (411) may include a capacitor (C1) and an inductor (L1). Furthermore, the first circuit (411) may determine a spurious characteristic of a signal of first band, along with the third circuit (413) and the fifth circuit (415). Still furthermore, the first circuit (411) may match impedances of first load (440) and antenna (430), along with the fourth circuit (414) and fifth circuit (415). The second circuit (412) may include a capacitor (C2), and may bypass a signal of first band.

The third circuit (413) may include a capacitor (C3). Furthermore, the third circuit (413) may convert a balance signal to an unbalance signal relative to first and second signals included in a signal of first band, and convert an unbalance signal to a balance signal. In addition, the third circuit (413) may determine a spurious characteristic of a signal of first band, along with the first circuit (411) and the fifth circuit (415).

The fourth circuit (414) may include a capacitor (C4) and an inductor (L2). Furthermore, the fourth circuit (414) may branch phases of first and second signals included in the first signal. Still furthermore, the fourth circuit (414) may match impedances of first load (440) and antenna (430), along with the first circuit (411) and fifth circuit (415).

The fifth circuit (415) may include a capacitor (C5) and inductors (L3, L4). Furthermore, the fifth circuit (415) may interrupt a signal of second band. In addition, the fifth circuit (415) may move a phase of a signal at the second band along with the seventh circuit (422), and match impedances of first load (440) and antenna (430), along with the first circuit (411) and the fourth circuit (414). Furthermore, the fifth circuit (415) may determine a spurious characteristic of a signal of first band, along with the first circuit (411) and the third circuit (413).

The sixth circuit (421) may include a capacitor (C6) and an inductor (L6). The sixth circuit (421) may interrupt a signal of first band, and determine a bandwidth of a signal of third band, along with the seventh circuit (422), and may match impedances of second load (450) and antenna (430). Furthermore, the sixth circuit (421) may determine a spurious characteristic relative to a signal of second band.

The seventh circuit (422) may include a capacitor (C5). The seventh circuit (422) may determine a bandwidth of a signal of third band, along with the sixth circuit (421), and may match impedances of second load (450) and antenna (430). Furthermore, the seventh circuit (4221) may move phase of a signal at second band, along with the fifth circuit (415).

Particularly, a detailed explanation will be provided as under in which the first circuit (411), the third circuit (413) and the fifth circuit (415) determine the spurious characteristic relative to a signal of first band, when a frequency of first band is approximately 2.4 GHz, and a frequency of second band is approximately 5 GHz.

Capacitor values of capacitors (C1, C5) and inductance values of inductors (L4, L5) may be so set as to allow a circuit (411a) in which the capacitor (C1) and the inductor (L5) included in the first circuit (411) are serially connected, and a circuit (415a) in which the capacitor (C5) and the inductor (L4) included in the fifth circuit (415) are serially connected, to be resonant at 4.0 GHz~5.1 GHz.

Furthermore, when an SRF (Self-Resonant Frequency, 4.0 GHz~6.0 GHz) of the capacitor (C3) included in the third circuit (413) is utilized, configuration can be made free from inductors. To be more specific, resonance can be implemented at 4.0 GHz~5.1 GHz without a separate inductor, when a capacitor value of the capacitor (C3) included in the third circuit (413) is 4.0 pF.

Next, a detailed explanation will be provided hereunder about contents of the sixth circuit (421) that determines a spurious characteristic relative to a signal of second band, when a frequency of first band is approximately 2.4 GHz, and a frequency of second band is approximately 5 GHz.

A capacitance value of the capacitor (C6) and an inductance value of the inductance (L6) may be so set as to allow a circuit (421a), in which the capacitor (C6) and the inductor (L6) included in the sixth circuit (421) are serially connected, to generate a first resonance at 2.3 GHz~2.5 GHz, to generate a second resonance 4.0 Hz~6.0 GHz, and to lastly generate a third resonance at 11.0 GHz~14.0 GHz.

Through this configuration, the RF module of FIG. 4 can electrically separate a path of RF module corresponding to a frequency of mutually different bands even without being disposed with a diplexer. Furthermore, the RF module of FIG. 4 can reduce a branch loss and a path loss that may be generated by a diplexer, simplify and miniaturize an entire circuit and to decrease a manufacturing cost of the module.

Figure 5:
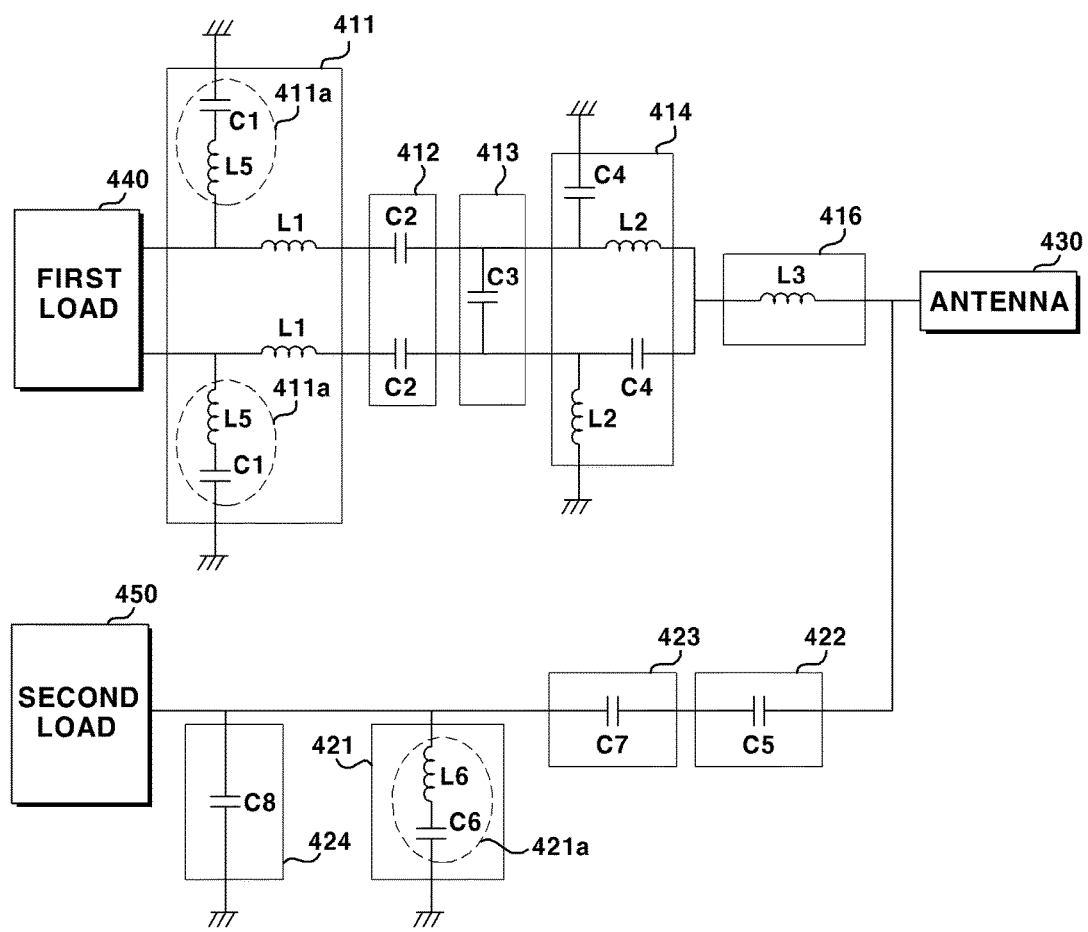

Now, referring to FIG. 5, the RF module may include first circuit (411) to seventh circuit (422), and may further include an eighth circuit (423) and a ninth circuit (424). No repetition will be made for a same configuration as that explained through FIG. 4 among the configurations included in the RF module of FIG. 5, and explanation will be centered on a configuration that is different by comparing with FIG. 4.

The fifth circuit (416) may omit a circuit (415a) in which the capacitor (C5) and the inductor (L4) are serially connected as illustrated in FIG. 4, when configuration is formed using an SRF of an inductor. That is, the fifth circuit (416) may be implemented by including one inductor (L3).

The eighth circuit (423) may include a capacitor (C7). Furthermore, the eighth circuit (423) may more finely adjust a bandwidth of a signal at the second band than the sixth and seventh circuits (421, 422) determine the bandwidth of a signal at the second band.

The ninth circuit (424) may include a capacitor (C8). Furthermore, the ninth circuit (424) may reduce generation of second harmonic of a signal at the second band. That is, through the configuration thus explained, the RF module of FIG. 5 can electrically separate a path of RF module corresponding to a frequency of mutually different bands even without being disposed with a diplexer. Furthermore, the RF module of FIG. 5 can more finely adjust a bandwidth of a signal at the second band and reduce generation of second harmonic of a signal at the second band.

Figure 6:
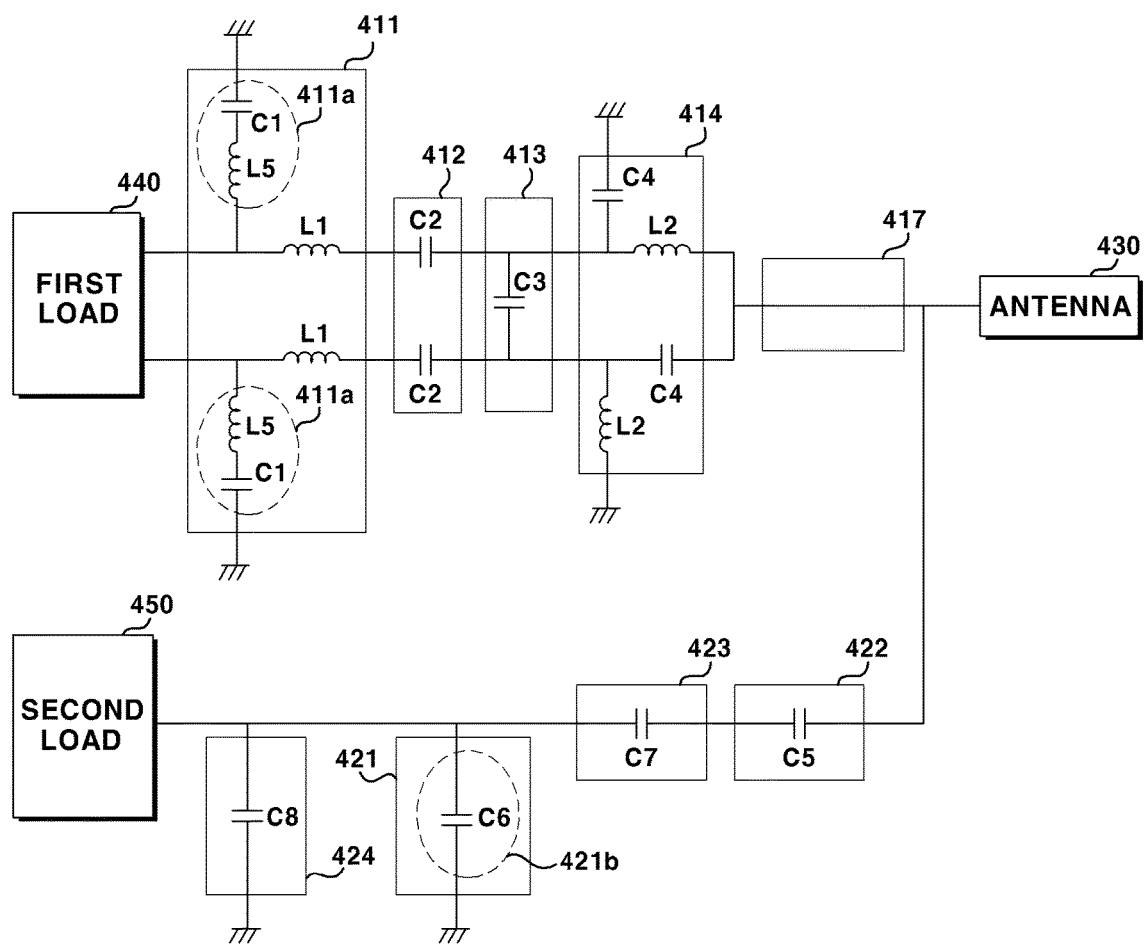

Now, referring to FIG. 6, the RF module may include first circuit (411) to ninth circuit (424). No repetition will be made for a same configuration as that explained through FIG. 5 among the configurations included in the RF module of FIG. 6, and explanation will be centered on a configuration that is different by comparing with FIG. 5.

The fifth circuit (417) may be so set as to allow an inductance value of inductance (L3) illustrated in FIG. 5 to be zero (0). That is, the fifth circuit (417) may be implemented by including only a line resistor, and by not including an inductor and a capacitor.

The sixth circuit (421) may not be implemented by a circuit (415a) in which a capacitor (C6) and an inductor (L6) are serially connected as illustrated in FIG. 5, but may be implemented using a circuit (421b) including a capacitor (C6) by setting a capacitance value of the capacitor (C6) at a particular value to thereby remove an inductor.

Through the configuration thus explained, the RF module of FIG. 6 can electrically separate a path of RF module corresponding to a frequency of mutually different bands even without being disposed with a diplexer. Furthermore, the RF module of FIG. 6 can further simplify and miniaturize an entire circuit and to further decrease a manufacturing cost of a module.

Figure 7:
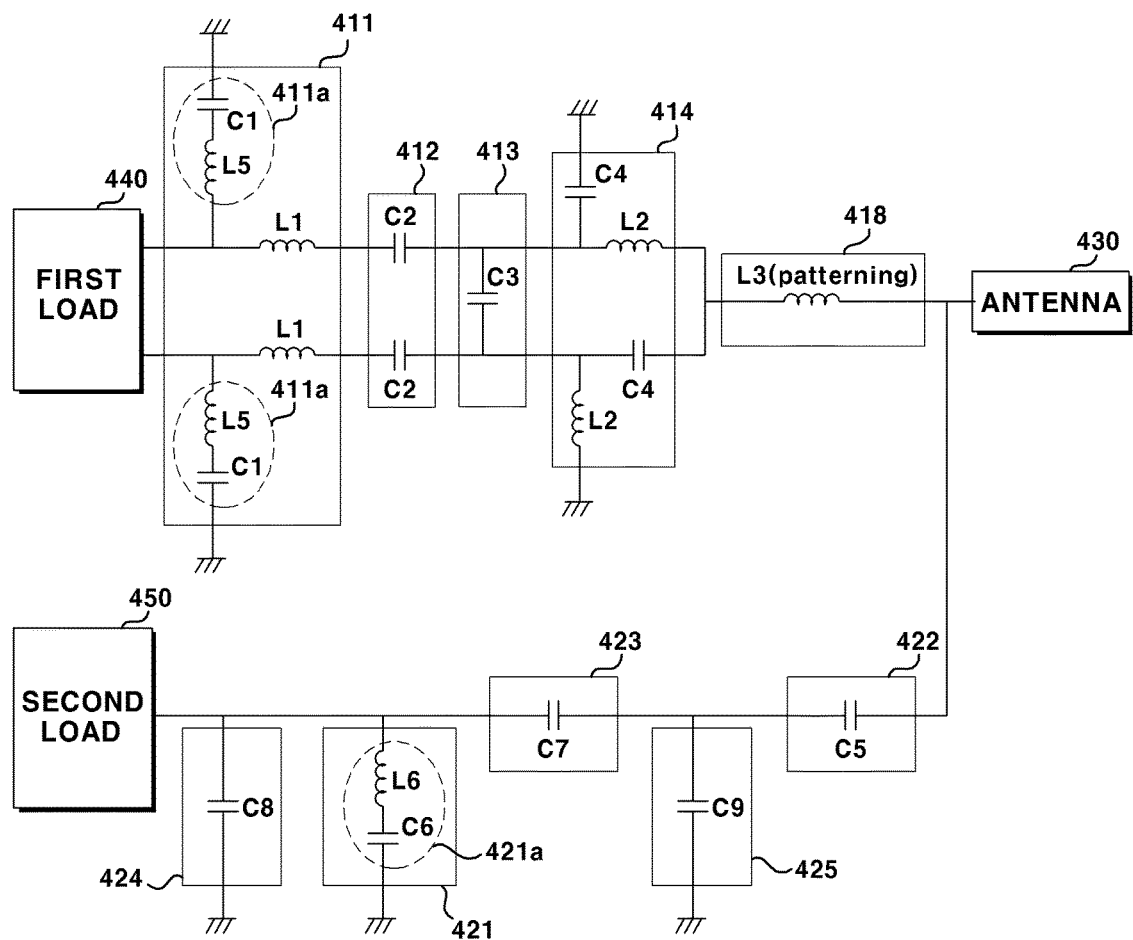

Now, referring to FIG. 7, the RF module may include first circuit (411) to ninth circuit (424), and may further include a tenth circuit (425). No repetition will be made for a same configuration as that explained through FIG. 5 among the configurations included in the RF module of FIG. 7, and explanation will be centered on a configuration that is different by comparing with FIG. 5.

The fifth circuit (418) may be implemented by patterning one inductor (L3) illustrated in FIG. 5.

The tenth circuit (425) may include a capacitor (C9). Furthermore, the tenth circuit (425) may be so configured as to reduce generation of a third harmonic of a signal at the second band.

That is, through the configuration thus explained, the RF module of FIG. 7 can electrically separate a path of RF module corresponding to a frequency of mutually different bands even without being disposed with a diplexer. Furthermore, the RF module of FIG. 7 can reduce generation of third harmonic of a signal at the second band.

Figure 8:
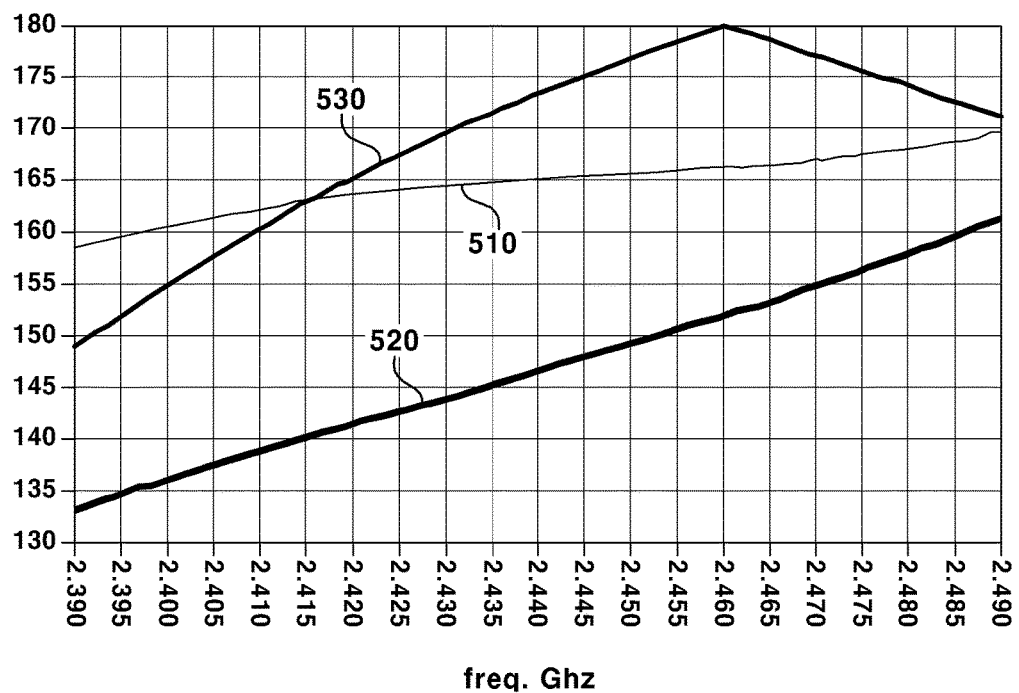
FIGS. 8 to 10 are schematic views illustrating an implementation characteristic of the present invention.
Figure 9:
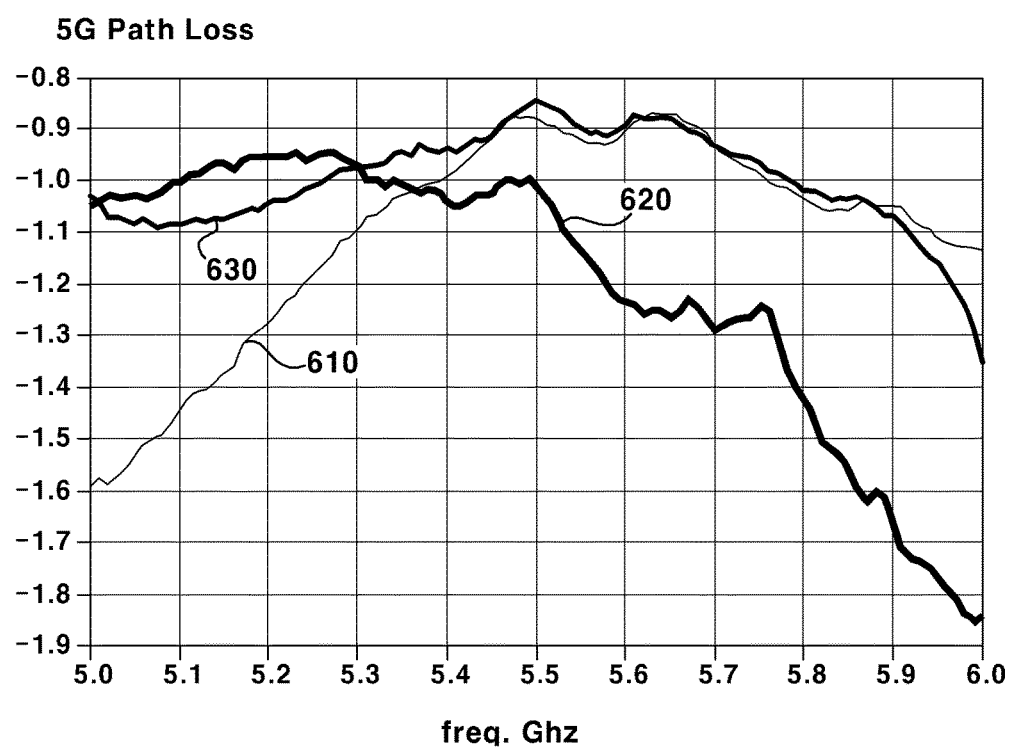
Figure 10:
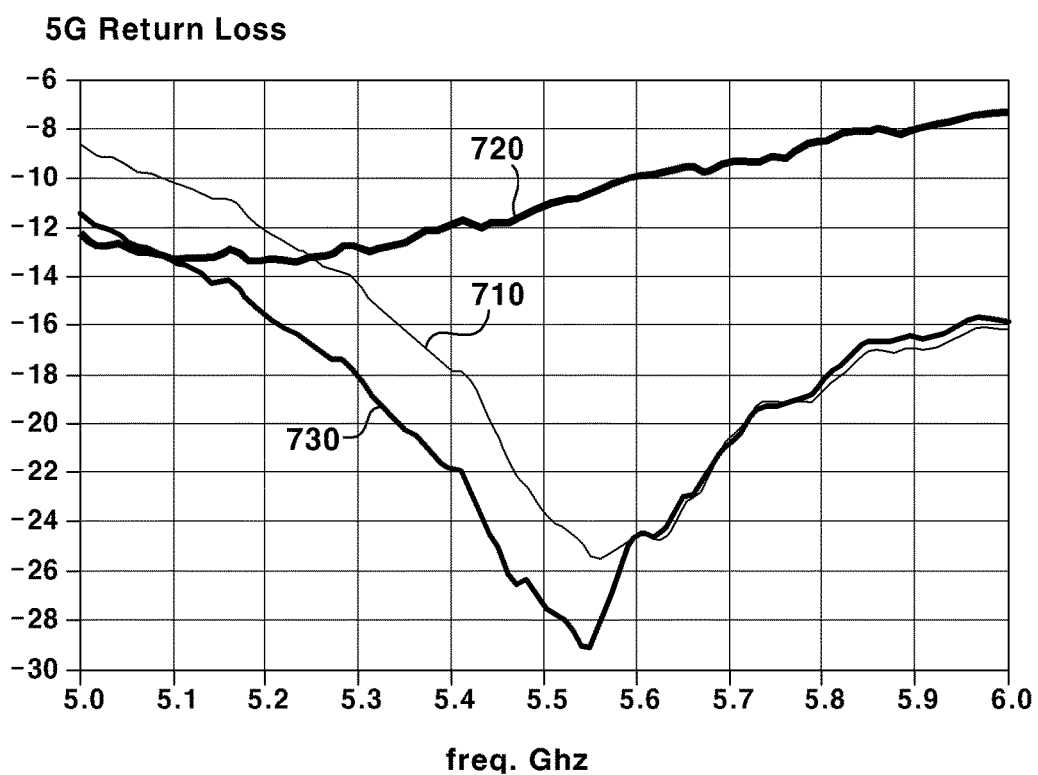

FIGS. 8 to 10 are schematic views illustrating an implementation characteristic of the present invention, where FIG. 8 is a view illustrating a phase difference caused by frequencies of first signal and second signal included in a signal of first band when a frequency of first band is 2.4 GHz. For information, an ideal phase difference between the first signal and the second signal is 180°.

First, a first graph (510) of an absolute value of slope being smallest illustrates a phase difference between the first and second signals measured by a conventional RF module disposed with a diplexer. Furthermore, a second graph (520) having a constant slope with an absolute value of a relevant slope being the greatest illustrates a phase difference between the first and second signals measured by the RF module according to the present invention, and a third graph (530) in which a slope is abruptly changed based on a particular frequency illustrates a phase difference between the first and second signals measured by the RF module according to the present invention explained through FIG. 5.

Compared with the first graph (510), although the second and third graphs (520, 530) show that a scope of illustrating a phase difference caused by a frequency increases, it can be ascertained that a path of RF module corresponding to a frequency of mutually different bands can be electrically separated even without being disposed with a diplexer.

FIG. 9 is a view illustrating a loss of a path to which a signal of second band is transmitted, when a frequency of second band is 5 GHz.

First, a first graph (610) of an absolute value of path loss being the greatest at a frequency of 5 GHz illustrates a path loss measured by the conventional RF module disposed with a diplexer. Furthermore, a second graph (620) of an absolute value of path loss being the greatest at a frequency of 6 GHz illustrates a path loss measured by the RF module according to the present invention explained through FIG. 4. Next, a third graph (630) in which an absolute value of path loss is not abruptly changed despite changes in frequency illustrates a path loss measured by the RF module according to the present invention explained through FIG. 5.

Compared with the first graph (610), and when a frequency of second band is 5 GHz, it can be ascertained that a path loss of the RF module according to the present invention is reduced in the second and third graphs (620, 630) that are not disposed with a diplexer.

FIG. 10 is a view illustrating a reflection loss of a signal at the second band when a frequency of second band is 5 GHz.

First, a first graph (710) having a smallest absolute value of reflection loss being the smallest at a frequency of 5 GHz illustrates a reflection loss measured by the conventional RF module disposed with a diplexer. Furthermore, a second graph (720) in which an absolute value of reflection loss is not abruptly changed despite changes in frequency illustrates a reflection loss measured by the RF module according to the present invention explained through FIG. 5. Next, a third graph (730) in which an absolute value of reflection loss is greatest at a frequency of 5.55 GHz illustrates a reflection loss measured by the RF module according to the present invention explained through FIG. 6.

Compared with the first graph (710), it can be ascertained from the second graph (720) and the third graph (730) that a reflection loss of RF module according to the present invention not disposed with a diplexer and not disposed with a separate matching circuit is similar to a reflection loss of an RF module disposed with a diplexer, when a frequency of second band is 5 GHz.

Graphs in FIGS. 8 to 10 illustrate a result so implemented as to have a time constant for separating signals corresponding to 2.4 GHz and 5 GHz in the first FEM and the second FEM included in the RF module when a frequency of first band is 2.4 GHz and a frequency of second band is 5 GHz. Furthermore, it should be apparent that implementation can be so made as to have a time constant for separating signals corresponding to other frequencies in response to setting of a plurality of elements disposed in the first circuit (411) to the ninth circuit (424) included in the RF module according to the present invention.

In short, the RF module according to the present invention, unlike the conventional RF module, can electrically separate a path of a signal corresponding to a frequency of mutually different bands even without being disposed with a diplexer. As a result, the RF module according to the present invention can reduce a power branch loss, an impedance matching loss and a path loss generated by a diplexer.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

What is claimed is:
1. An RF module comprising:
   a first FEM (Front End Module) passing a signal of first band and interrupting a signal of second band in response to a first time constant determined by a plurality of elements disposed thereinside; and
   a second FEM interrupting a signal of first band and passing a signal of second band in response to a second time constant determined by a plurality of elements disposed thereinside, and
   wherein the first time constant is so determined as to be between 0.9 and 1.0 in size of reflection coefficient at the first FEM relative to a frequency of a signal at the second band, and as to be positioned between −50° and 30° in phase of the reflection coefficient.

2. The RF module of claim 1, wherein the signal of the first band includes a first signal and a second signal having a phase difference.

3. The RF module of claim 2,
wherein the first FEM transmits a signal of first band received from an antenna to a first load, and transmits a signal of first band transmitted from the first load to the antenna, and
wherein the second FEM transmits a signal of second band received from the antenna to a second load, and transmits a signal of second band transmitted from the second load to the antenna.

4. The RF module of claim 3,
wherein the first FEM includes first to fifth circuits, and the second FEM includes sixth and seventh circuits, and
wherein the first circuit, the fourth circuit and the fifth circuit match the first load and impedance of the antenna at the signal of first band, and the sixth circuit and the seventh circuit match the second load and impedance of the antenna at the signal of second band.

5. The RF module of claim 4, wherein one circuit of the first to seventh circuits includes at least one of a resistor, a capacitor and an inductor.

6. The RF module of claim 3,
wherein the first FEM includes first to fifth circuits, and the second FEM includes sixth and seventh circuits, and
wherein the fourth circuit branches phases of first signal and second signal, and the fifth circuit and the seventh circuit move a phase of signal at the second band.

7. The RF module of claim 6, wherein one circuit of the first to seventh circuits includes at least one of a resistor, a capacitor and an inductor.

8. The RF module of claim 3,
wherein the first FEM includes first to fifth circuits, and the second FEM includes sixth and seventh circuits, and
wherein the fourth circuit interrupts a signal of second band and the sixth circuit interrupts a signal of first band.

9. The RF module of claim 8, wherein one circuit of the first to seventh circuits includes at least one of a resistor, a capacitor and an inductor.

10. The RF module of claim 3,
wherein the first FEM includes first to fifth circuits, and the second FEM includes sixth and seventh circuits, and
wherein the first, third and fifth circuits determine a spurious characteristic relative to the signal of first band, and the sixth circuit determines a spurious characteristic relative to the signal of second band.

11. The RF module of claim 10, wherein one circuit of the first to seventh circuits includes at least one of a resistor, a capacitor and an inductor.

12. The RF module of claim 3,
wherein the first FEM includes first to fifth circuits, and the second FEM includes sixth and seventh circuits, and
wherein the second circuit bypasses a signal of first band, and the third circuit converts a balance signal to an unbalance signal relative to the first and second signal and converts an unbalance signal to a balance signal.

13. The RF module of claim 12, wherein one circuit of the first to seventh circuits includes at least one of a resistor, a capacitor and an inductor.

14. The RF module of claim 3,
wherein the first FEM includes first to fifth circuits, and the second FEM includes sixth and seventh circuits, and
wherein the sixth and seventh circuits determine a bandwidth of a signal at the second band.

15. The RF module of claim 14, wherein one circuit of the first to seventh circuits includes at least one of a resistor, a capacitor and an inductor.

16. The RF module of claim 14,
wherein the second FEM further includes eighth and ninth circuits,
wherein the eighth circuit determines a bandwidth of a signal at second band using a unit smaller than a basic unit determining bandwidth of a signal at the second band, and
wherein the ninth circuit reduces a second harmonic of a signal at the second band.

17. The RF module of claim 16, wherein one circuit of the first to ninth circuits includes at least one of a resistor, a capacitor and an inductor.

18. The RF module of claim 16, wherein the second FEM further includes a tenth circuit, wherein the tenth circuit reduces a third harmonic of a signal at the second band.

19. The RF module of claim 18, wherein one circuit of the first to tenth circuits includes at least one of a resistor, a capacitor and an inductor.

20. An RF module comprising:
a first FEM (Front End Module) passing a signal of first band and interrupting a signal of second band in response to a first time constant determined by a plurality of elements disposed thereinside; and
a second FEM interrupting a signal of first band and passing a signal of second band in response to a second time constant determined by a plurality of elements disposed thereinside,
wherein the second time constant is so determined as to be between 0.9 and 1.0 in size of reflection coefficient at the second FEM relative to a frequency of a signal at the second band, and as to be positioned between −50° and 30° in phase of the reflection coefficient.

* * * * *